Feb. 1, 1955 G. H. SMITH 2,700,781
AIR SEA RESCUE EQUIPMENT
Filed March 15, 1951
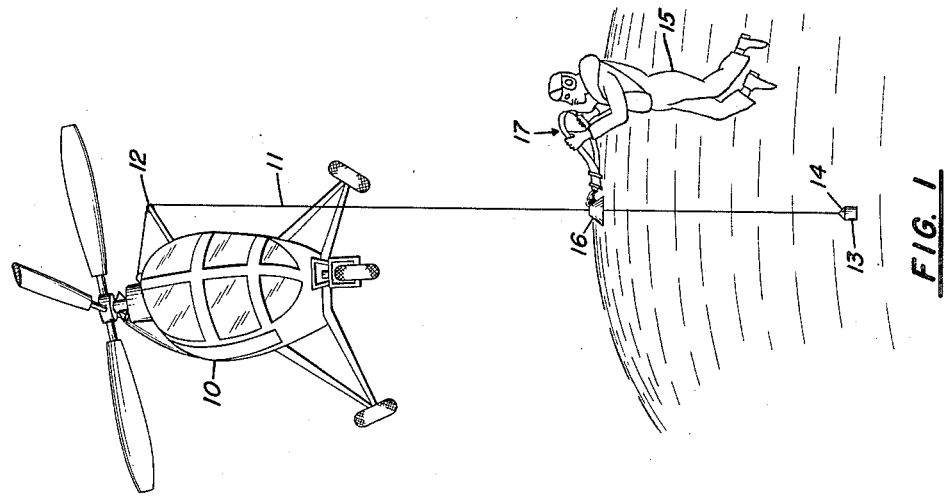
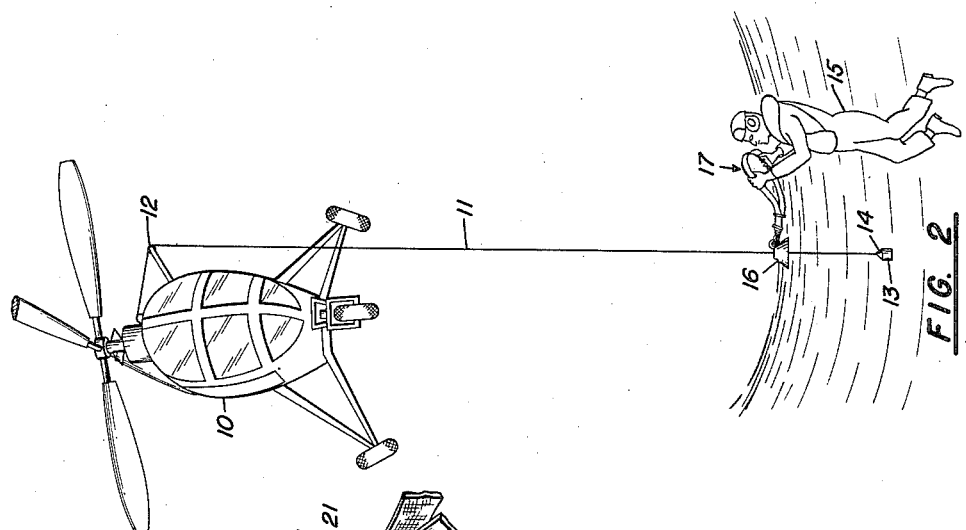
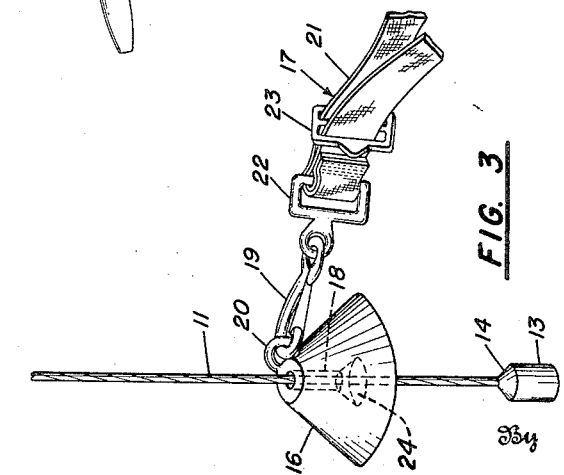
Inventor
GEORGE H. SMITH

2,700,781

AIR SEA RESCUE EQUIPMENT

George H. Smith, United States Navy

Application March 15, 1951, Serial No. 215,849

2 Claims. (Cl. 9—14)

(Granted under Title 35, U. S. Code (1952), sec. 266)

The present invention relates generally to sea-air rescue equipment and specifically to a life-saving harness to be lowered from a relatively stationary aircraft to a person afloat in the sea.

Life-saving equipment presently in use for rescue of aviators and other persons cast adrift embody a dropline and weight, preferably suspended from a helicopter, with an appropriate harness on the end of the drop-line to which the person adrift attaches himself. However, presently used equipment of the sort is imperfect and subjects the person to be rescued to additional hazards and inconvenience. The drop-line and weighted harness are lowered by a winch from the relatively motionless aircraft and in heavy or moderately heavy seas, the harness at the end of the suspended line alternatingly is above the water surface during a trough condition of the sea or is immersed in several feet of water as a wave crest passes. The floating person, attempting to reach the harness and secure it about his body is carried under the water by the weighted harness or is unable to maintain his grasp on it as it is relatively jerked out of the water.

The principal object of this invention is to provide a harness and drop-line apparatus which permits the person afloat to attach himself to the harness in spite of the recurring up-and-down motion caused by wave crests and following troughs.

Another object is to provide such an apparatus which maintains its distinctive feature of being sufficiently weighted as to remain approximately under the motionless aircraft and not loosely floating on the sea under condition of a floating harness and slack line.

Rescue teams in helicopters are adept at placing the rescue harness immediately adjacent the person adrift and by skillful maneuvering of the aircraft can hover and follow the sea-washed person as waves and wind toss and move him about.

The use of a simple floating harness, which might seem obvious, is not desirable for the reason that it is more difficult to control on the surface of the sea and cannot always be cast within arms length of the person adrift, and is more apt to float away faster than the nearly totally immersed person.

The present invention therefore maintains the feature of an easily controllable drop-line and weight and provides a floatable gear on that drop-line which is easily reached by the person to be rescued.

Other objects and advantages of the invention will hereinafter become more fully apparent from the following description of the annexed drawings, which illustrate a preferred embodiment, and wherein:

Fig. 1 shows a view of a rescue aircraft and person to be rescued with the relative position of the apparatus of this invention between them as during a wave crest.

Fig. 2 shows the same aircraft, person afloat, and the apparatus of the invention in a wave trough; and Fig. 3 shows a plan view in detail of the elements of the apparatus.

Referring to the drawings in which like numerals indicate like parts throughout the several views, a helicopter aircraft is shown at 10, more or less schematically, and has a cable 11 emerging from its structure and passing over pulley 12, in a conventional manner.

At the end of cable 11 is a weight 13 of sufficient mass to suspend the cable approximately vertically and not subject to extensive drift by action of the sea or wind. Weight 13 has a slightly conical upper end 14 for the purposes of offering the least drag downward in a dropping sea. It is seen in Figs. 1 and 2 that the cable 11 and weight 13 after having been payed out by the aircraft's winch maintains the weight 13 at a fixed distance from the mean sea level but due to the wave action varies considerably in depth from the surface of the water and therefore not always within grasp of the person adrift indicated at 15.

Therefore, this invention comprises the float 16 of sufficient buoyancy to support the harness 17 and is made of any suitable material lighter than water or formed of sheet metal enclosing an air space and having a tubular sleeve 18 through its body through which is loosely slidable cable 11. The lower surface of the float is provided with a flared opening 24 in line with the sleeve 18 to receive the conical upper end 14 of the weight 13 in nested relation, thus supporting the float at the end of the cable when it is raised out of the water.

Harness 17 comprises a suitable snap 19 attachable to eye 20 of float 16 and suitable harness strap loop 21 together with buckle 22 and slip-buckle 23 which enables the harness 17 to the tightened about and secured to the person adrift so that the aircraft's winch can raise and haul him aboard.

In operation, the cable 11 with its weight 13 on the end and the float 16 with harness 17 attached is lowered from the rescuing aircraft; or the cable 11 and weight 13 is lowered first, the float 16 and harness 17 being later slid down the cable, as seems best to the rescue team. In some cases, the latter procedure may be best, so that the weight 13 only may be submerged to enable the rescue aircraft to come upwind or against a running sea with the least possible drag on the cable, then when near the person to be rescued the float 16 and harness 17 may be released and slid down the line to the surface of the sea. The person to be rescued may then attach himself to the harness regardless of the wave action.

The operation as thus described shows the invention to be an improvement over the presently used apparatus which usually consists of a harness secured to the end of a weighted cable and one which repeatedly "dunks" the person to be rescued under the wave crests, the necessarily heavy weight on the cable being frequently greater than the buoyancy of the person adrift when encumbered with heavy clothing or equipment as worn by pilots, aviators or the like.

Various modifications are contemplated and may obviously be resorted to by those skilled in the art without departing from the spirit and scope of the invention as hereinafter defined by the appended claims, only a preferred embodiment thereof having been herein illustrated.

The invention described herein may be manufactured and used by or for the Government of the United States of America for governmental purposes without the payment of any royalties thereon or therefor.

Having thus described the invention what is claimed is:

1. Sea-air rescue equipment comprising a single cable adapted to be payed out of a hovering aircraft to a person adrift, a weight having a conical upper surface on the end of the cable of sufficient mass to maintain the cable approximately vertical and relatively unaffected by waves or wind while submerged in the sea, a float freely slidable on said cable above the weight, and a lifting harness releasably secured to said float and maintained thereby substantially on the surface of the sea irrespective of the variable submergence of said weight due to wave crests and troughs, whereby a person attached to the harness may be lifted from the sea merely by retracting said cable.

2. Rescue equipment for use with hovering aircraft or the like comprising a single cable adapted to be payed out of and retracted into the aircraft, a weight on the end of the cable having a conical upper end, said weight being of sufficient mass while submerged in the sea to hold the cable approximately vertical against the effect of waves and wind, a lifting harness and a float attached thereto, said float being freely slidable on said cable and adapted to be carried by said weight to and from the surface of the sea, the lower end of said float being flared to receive in nested condition the conical upper end of said weight for supporting the float at the end of the cable when it is raised out of the water.

(References on following page)

References Cited in the file of this patent

UNITED STATES PATENTS

| Number | Name | Date |
|---|---|---|
| 262,843 | Smith et al. | Aug. 15, 1882 |
| 1,282,323 | Trinkle | Oct. 22, 1918 |
| 1,394,824 | Habrich | Oct. 25, 1921 |
| 1,531,946 | Jacobsson | Mar. 31, 1925 |
| 2,103,708 | Campbell | Dec. 28, 1937 |
| 2,338,067 | Wicklow | Dec. 28, 1943 |

FOREIGN PATENTS

| | | |
|---|---|---|
| 26,011 | Norway | June 28, 1915 |

OTHER REFERENCES

"Helicopter," pages 29–30, December 1945.